June 28, 1932. H. PARKER 1,864,611
MULTIPLE CONDUIT AND TIE ELEMENT THEREFOR
Filed March 21, 1930

Inventor:
Howard Parker.
by Wright Brown Quinby & May
Att'ys.

Patented June 28, 1932

1,864,611

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MULTIPLE CONDUIT AND TIE ELEMENT THEREFOR

Application filed March 21, 1930. Serial No. 437,694.

This invention relates to a multiple conduit section which is characterized by relatively light weight, strength, cheapness and ease of assembling. The materials employed in the multiple conduit section, according to this invention, furthermore, have a high electrical resistance so that such conduit sections when laid together form suitable cores for a concrete structure which can be poured around these conduits to contain electric power cables and the like. The absence of any metallic or other conducting elements in the conduit sections is advantageous in that there is no material present in the finished conduit in which electric currents can be induced by magnetic fields surrounding power cables which carry heavy alternating currents.

The multiple conduit embodying the present invention is characterized by its simplicity and cheapness and by the ease with which it may be assembled and handled. In laying a long multiple conduit for wires or other purposes, it is advantageous to use multiple conduit sections which can be readily joined end to end with a very considerable saving of time, labor and expense. It is often advantageous to be able to assemble such multiple conduit sections near the location where they are to be laid rather than in the mill where the individual tubes or conduits are made. The multiple conduit section hereinafter described is of such a nature as to be readily assembled on the field or in the mill.

For lightness and strength, waterproofed fibrous tubes are employed as elements of the multiple conduit. Such tubes may be made by rolling a sheet of wet pulp upon itself on a mandrel under pressure until the desired wall thickness is obtained, then removing the wet tube from the mandrel and drying it, after which it may be saturated with asphalt, pitch, or any other suitable waterproofing material. The saturated tube may also be treated with an inner and an outer coating of a suitable waterproofing material such as oxidized or blown asphalt to render it more proof against moisture. These tubes have a high electrical resistance and are well suited for conduits intended to carry electric power cables or the like, as well as for other forms of service.

In assembling tubes of this kind to form sections of multiple conduit, various means have heretofore been employed for holding the multiple conduit sections together. Such means, in general, have been found objectionable for one reason or another. According to the present invention a very simple tie member is provided which is easily applied and which is especially adapted for the desired service. A tie member embodying the invention may be made by taking a suitable cord or strand of fiber such as manila or hemp, the cord being of sufficient size for the purpose, then saturating the strand in a waterproofing material such as gilsonite or other pitchy substance. The cord is preferably coated, in addition, with a waterproofing substance such as pitch or the like which is tacky at ordinary atmospheric temperatures. Thus when a multiple conduit section is assembled, the tie member, being tacky, is easily secured by a simple knot and is not liable to slip.

For a more complete understanding of the invention reference may be had to the description thereof which follows and to the drawing, of which,—

Figure 1:
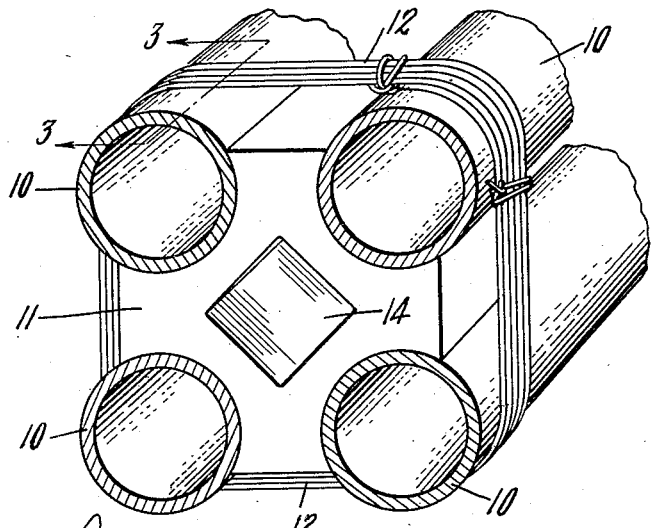
Figure 1 is a fragmentary perspective view of a portion of a multiple conduit embodying the invention.
Figure 2:
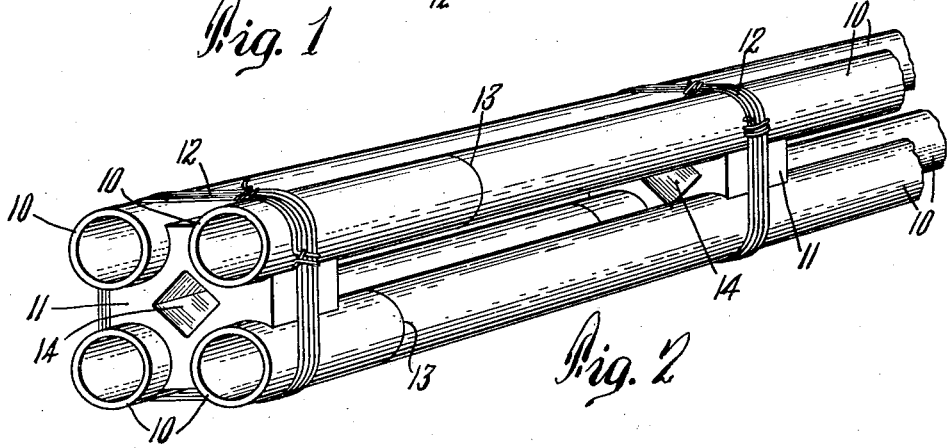
Figure 2 is a perspective view of a larger portion of a multiple conduit section made up of a short odd lengths of single conduit, this figure showing also the arrangement of the spacers and tie members.

By way of illustration, a multiple conduit section of four conduits is shown on the drawing, the individual conduits 10 being held in uniformly spaced relation, as by a suitable number of spacing blocks 11, the conduit being held together by a number of separate, spaced tie members 12. As shown in Figure 2, the blocks 11 are preferably arranged at suitable intervals according to the size and and strength of the individual conduits, a tie member 12 being secured around the multiple conduit section opposite each spacing block 11 so that the individual conduits 10 are each gripped between the blocks 11 and the adjacent tie members 12. Ordinarily, individual conduit sections of equal length are assembled to form the multiple conduit sections, but by joining odd lengths of conduit together by means of suitable joints, as at 13, multiple conduit sections may also be built up from pieces of single conduit which have had defective portions removed, the perfect portions being shorter than the standard length but available for multiple conduits. By staggering the joints 13, a multiple conduit section is obtained having a rigidity substantially equal to that of a multiple conduit section formed of standard lengths of single conduit. The spacing blocks 11 may be of any suitable material, preferably a material having a high electrical resistance combined with sufficient mechanical strength and lightness of weight. For this purpose I may use a cinder cement mixture which can be readily molded to shape and which is relatively strong and light in weight.

Figure 3:
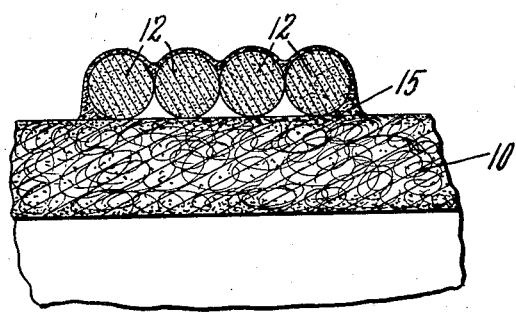
Figure 3 is a fragmentary section on the line 3—3 of Figure 1.

Blocks of this material bond well with concrete which may be poured around the conduits 10 when the conduit section is laid with others to form a continuous line of cores for a concrete structure. The blocks 11 may be provided with a central aperture 14 to economize in weight, and hence in shipping charges, and to provide for more efficient longitudinal bonding of a concrete mixture which may be poured around the conduits when laid in position for use. The tie members 12 are preferably of fibrous strand material, which have been saturated and coated with gilsonite, pitch, or other suitable substance. For example, ordinary tarred marlin may be soaked for a few minutes in a melted mixture of 50% of coal tar or water-gas pitch (melting-point about 160° to 170° F.), 45% of wood tar, and 5% of heavy machine oil. After soaking, the marlin is squeezed to remove excess saturant and cooled. If greater strength is desired, rope yarns or other strands may be similarly treated. This renders the strands substantially free from shrinkage by contact with moisture and from extension when dried so that when such a tie member has been applied properly to the conduit section, it does not work loose nor does it become excessively tight so as to pinch or deform the fibrous tubes 10. Just before use, the strand material is preferably coated with a gilsonite or asphalt paint to make it sticky. It is then easily secured in place by taking a turn or two around the standing parts with the free end. No elaborate knot is necessary. After applying the length of strand to form a tie member 12, I may also brush this tie member with pitch or the like to form an additional coating 15, as indicated in Figure 3. A multiple conduit section thus formed is simple and inexpensive, and it also possesses many other advantages hereinbefore enumerated. It can be readily assembled at the mill or on the field near where it is to be laid so that the parts can be readily shipped in a knock-down form to save shipping space.

I claim:

1. A multiple conduit section comprising a plurality of single fibrous conduits, spacing blocks between said single conduits, and separate fibrous tie members surrounding the multiple section at spaced points.

2. A multiple conduit section comprising a plurality of waterproofed fibrous tubes, a cement spacing block between said tubes, and a waterproofed strand secured to the multiple section opposite said block.

3. In a multiple conduit section, a tie element comprising a flexible fibrous strand having a sticky surface.

4. In a multiple conduit section, a tie element comprising a length of fibrous strand saturated with waterproofing material and coated with additional waterproofing material which is tacky at ordinary atmospheric temperatures.

5. In a multiple conduit section, a tie element comprising a length of fibrous strand material saturated with a mixture of approximately 50% coal tar, 45% wood tar, and 5% machine oil.

In testimony whereof I have affixed my signature.

HOWARD PARKER.